United States Patent [19]

Kadonaga et al.

[11] Patent Number: 5,233,491
[45] Date of Patent: Aug. 3, 1993

[54] DISC DRIVE WITH SNAP-FIT SEAL

[75] Inventors: Akira Kadonaga; Mamoru Osato, both of Kanagawa, Japan

[73] Assignee: Sony Corporation, Tokyo, Japan

[21] Appl. No.: 988,033

[22] Filed: Dec. 9, 1992

Related U.S. Application Data

[63] Continuation of Ser. No. 647,561, Jan. 29, 1991, abandoned.

Foreign Application Priority Data

Jan. 30, 1990 [JP] Japan .................................. 2-20046

[51] Int. Cl.⁵ ............................................. G11B 17/02
[52] U.S. Cl. ................................................ 360/97.02
[58] Field of Search ........................ 360/97.01–99.12

[56] References Cited

U.S. PATENT DOCUMENTS 4,418,369 11/1983 Applequist et al. ............. 360/97.03
4,633,349 12/1986 Beck et al. ....................... 360/97.02
5,025,335 6/1991 Stefansky ........................ 360/97.01

Primary Examiner—Robert S. Tupper
Attorney, Agent, or Firm—Lewis H. Eslinger; Jay H. Maioli

[57] ABSTRACT

A disc drive employing components including a recording disc, a read/write head, a head positioner, and an arm are mounted on a carriage member for recording data on the recording disc and reproducing recorded data from the recording disc. A cover member is secured to the carriage member to define a closed space in which the components are located by means of a resilient sealing member which provides resilient engagement with the carriage member and resilient engagement with the cover member without physically distorting the carriage member.

9 Claims, 5 Drawing Sheets

DISC DRIVE WITH SNAP-FIT SEAL

This is a continuation of application Ser. No. 07/647.561, filed Jan. 29, 1991, now abandoned.

BACKGROUND OF THE INVENTION

This invention relates to a memory device suitable for use with computers and, more particularly, to a disc drive employing a packing member to sealingly close a disc drive component storing space defined between a carrier member and a cover member.

Disc drive components including a recording disc, a read/write head, a head positioner, etc. have been installed on the upper surface of a chassis or carriage member and covered with a cover member secured on the upper surface of the carriage member to define a closed space in which the disc drive components are located. It is the current practice to sealingly close the space by bolting the cover member to the carriage member a packing or sealing member with interposed between them. In this practice, however, bending stresses occur in the carriage member because of the resilient force of the sealing member and also the lack of flatness of the surfaces with which the sealing member is in contact. The bending stresses will cause the carriage member to be strained so as to change the distance of the read/write head with respect to the recording disc.

SUMMARY OF THE INVENTION

Therefore, it is a main object of the invention to provide an improved disc drive capable of minimizing strains which may cause changes in the distance between the read/write head and the recording disc.

There is provided, in accordance with the invention, a disc drive having components including a recording disc, a transducer, and transducer positioning means for moving the transducer with respect to the recording disc for recording data on the recording disc and reproducing recorded data from the recording disc. The disc drive comprises a carriage member for carrying the components, the carriage member having an outer side surface; a cover member for combination with the carriage member to define a closed space in which the components are located, the cover member having an inner side surface; and a sealing member resiliently engaging with the outer side surface of the carriage member and also resiliently engaging with the inner side surface of the cover member to secure the cover member to the carriage member.

In another aspect of the invention, the disc drive comprises a carriage member for carrying the components, the carriage member having an inner side surface; a cover member for combination with the carriage member to define a closed space in which the components are located, the cover member having an outer side surface; and a sealing member resiliently engaging with the inner side surface of the carriage member and also resiliently engaging with the outer side surface of the cover member to secure the cover member to the carriage member.

In still another aspect of the invention, the disc drive comprises a carriage member for carrying the components, the carriage member having a peripheral side; a cover member having a top wall portion with a periphery, and a sidewall portion formed around the periphery of the top wall portion; and a sealing member disposed between the peripheral side of the carriage member and the sidewall portion to provide resilient engagement with the peripheral side of the carriage member and also resilient engagement with the sidewall portion of the cover member so as to secure the cover member to the carriage member.

In another aspect of the invention, the disc drive comprises a carriage member having a top wall portion for carrying the components, the top wall portion having a periphery, and a flange portion formed around the periphery of the top wall portion; a cover member having a top wall portion with a periphery, and a sidewall portion formed around the periphery of the top wall portion; and a sealing member disposed between the flange portion of the carriage member and the sidewall portion of the cover member to provide resilient engagement with the flange portion of the carriage member and also resilient engagement with the sidewall portion of the cover member so as to secure the cover member to the carriage member.

In still another aspect of the invention, the disc drive comprises a carriage member for carrying the components; a cover member for combination with the carriage member to define a closed spaced in which the components are located; and a resilient sealing member provided between the carriage member and the cover member to provide resilient engagement with the carriage member and resilient engagement with the cover member so as to secure the cover member to the carriage member.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
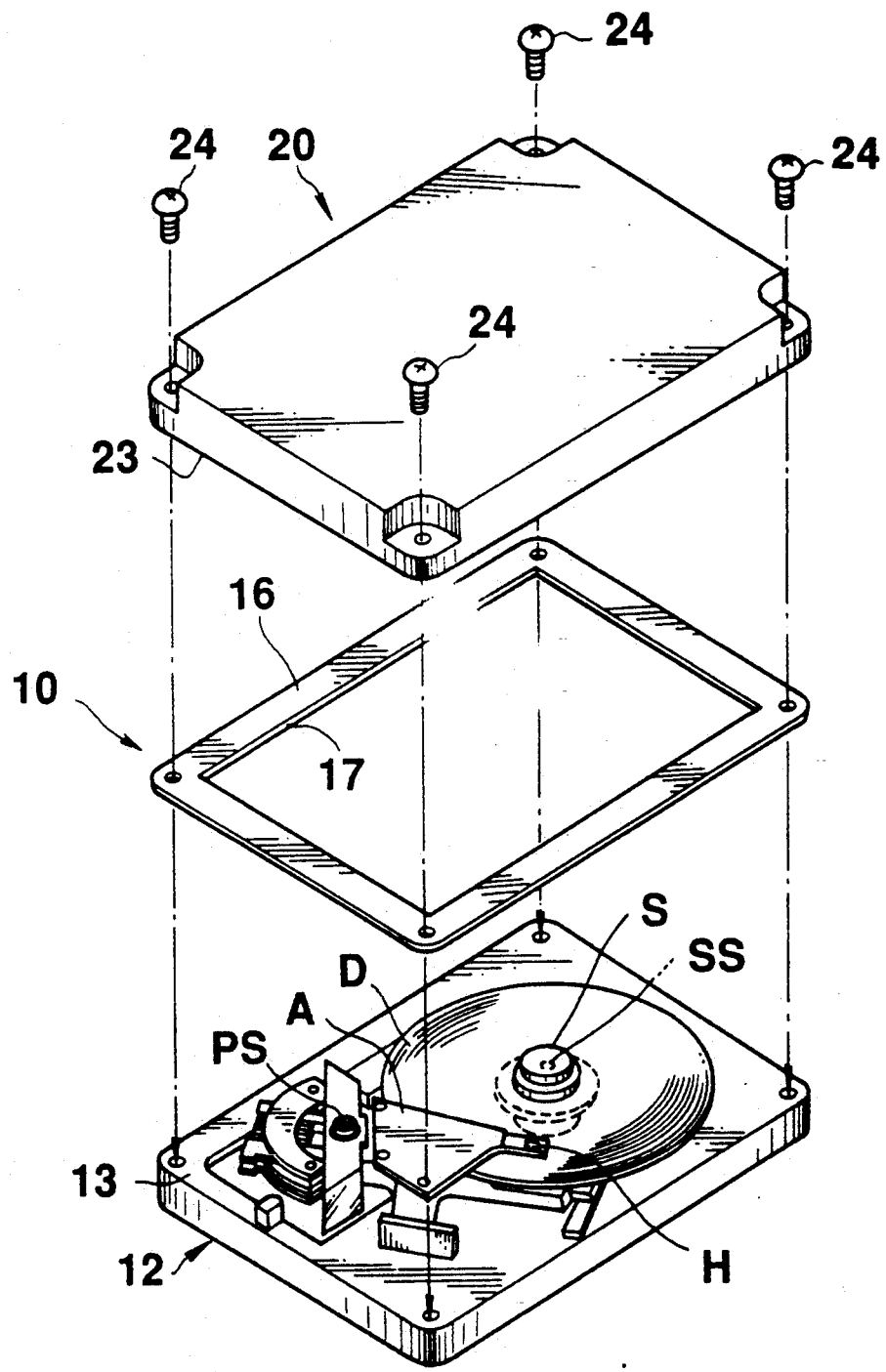
FIG. 1 is an exploded perspective view of a hard disc drive unit over which the invention is an improvement.
Figure 2:
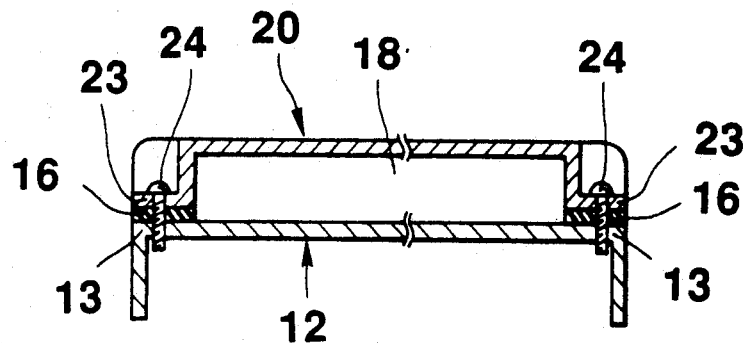
FIG. 2 is a sectional view of the hard disc drive unit of FIG. 1.

Prior to the description of the preferred embodiment of the present invention, a hard disc drive unit of FIGS. 1 and 2 on which the present invention is an improvement is briefly described in order to provide a basis for a better understanding of the difficulties attendant thereon.

The hard disc drive unit 10, which is a memory device for use with computers and the like, comprises a chassis 12 which has components including a recording disc D, a read/write head H, etc. mounted on its rectangular top wall 13. These components are contained in a closed space 18 defined by the chassis top wall 13 and a cover 20. The cover 20 is secured on the chassis top wall 13 through a packing member 16 placed on the chassis top wall 13. The packing member 16 serves as a seal for preventing dust from reaching the space 18. The packing member 16 has a size substantially the same as that of the chassis top wall 13 and it has a rectangular opening 17 appropriately shaped and sized to receive in projected relation therethrough the components of the disc drive unit 10. The cover 20 has a top wall 21 and a set of sidewalls 22 having their edge surfaces 23 placed on the packing member 16. The cover 20 is secured at its four corners to the chassis top wall 13 by means of bolts 24 each extending through the packing member 16 and also threadedly through the chassis top wall 13.

Figure 3:
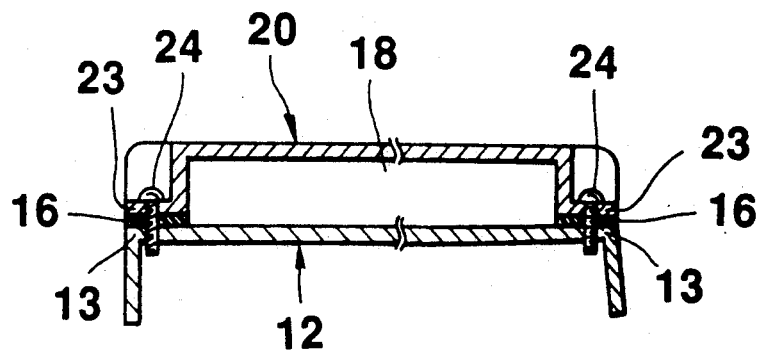
FIG. 3 is a sectional view used in explaining a problem attendant with the hard disc drive unit of FIG. 1.

When the bolts 24 are driven to tighten the packing member 16 between the chassis top wall 13 and the cover sidewall end surface 23 at different strengths, however, bending stresses occur in the chassis top wall 13 to cause the chassis top wall 13 to be strained, as shown in FIG. 3, so as to make a change of the relative distance between the shaft SS of the spindle S on which the disc D is mounted and the pivot shaft PS of the head supporting arm A to which the head H is mounted. The distance change has a serious influence on the recording and reproducing performance of the hard disc drive unit 10. This is true particularly when the chassis 12 is made of metal or plastic. Furthermore, it is very difficult, if not impossible, to provide the degree of accuracy required in the adjustment of the tightening force applied to the packing member 16.

Figure 4:
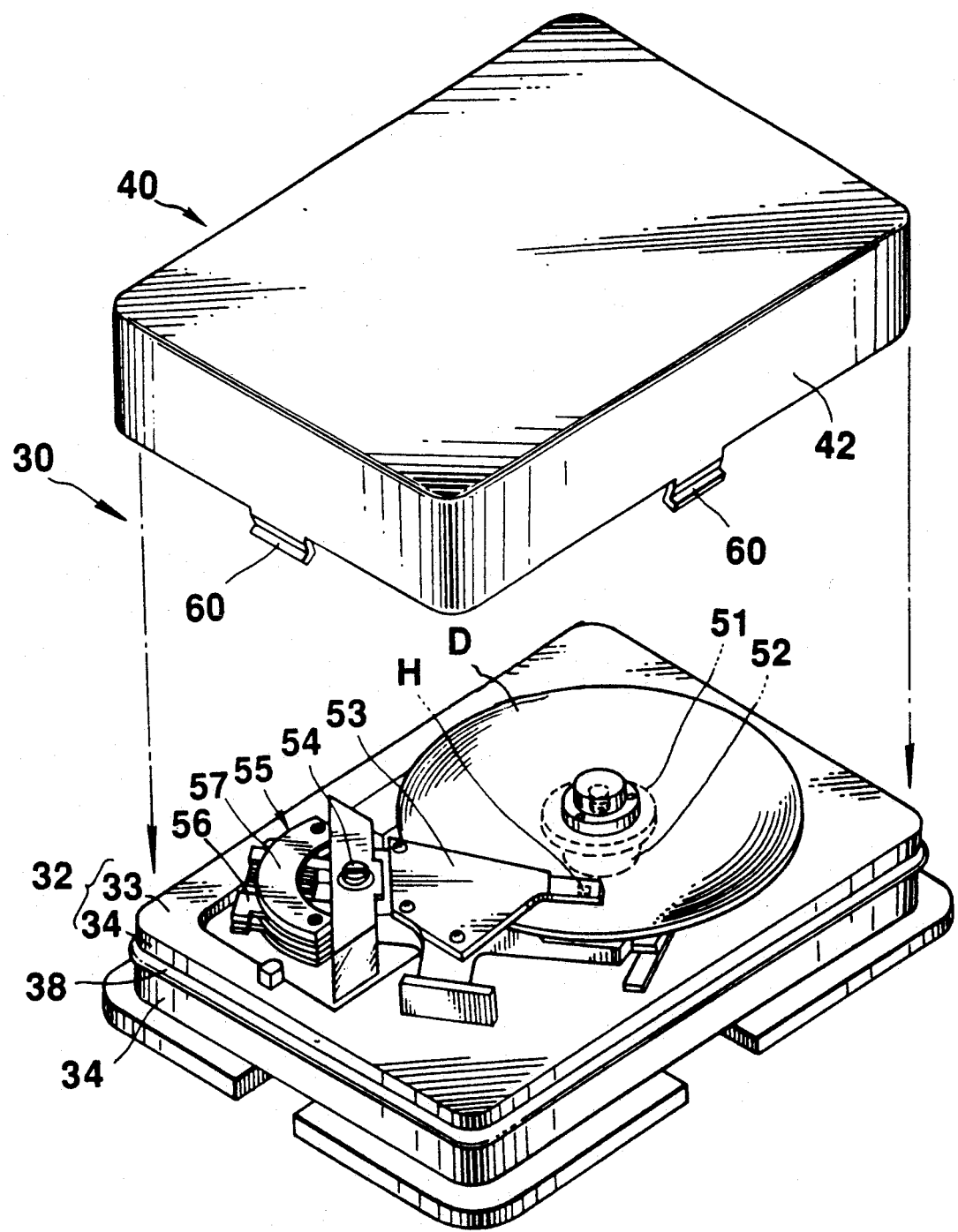
FIG. 4 is an exploded perspective view showing one embodiment of a disc drive unit made in accordance with the invention.
Figure 5:
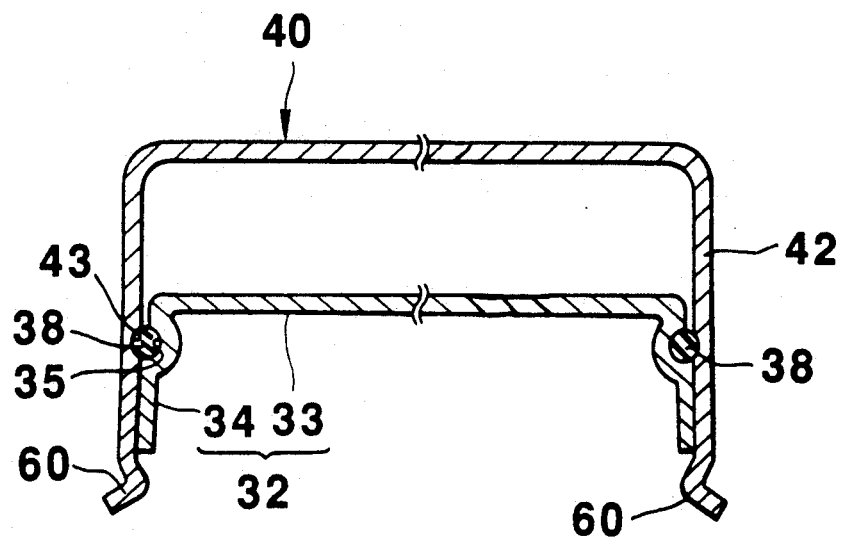
FIG. 5 is a sectional view of the disc drive unit of FIG. 4.

Referring to FIGS. 4 and 5, there is shown one embodiment of a disc drive unit made in accordance with the invention. The disc drive unit, generally designated by the numeral 30, includes a chassis or carriage member 32 for carrying disc drive components including a recording medium and a transducer, a cover member 40 combined with the carriage member 4 to define a closed space 36 in which the disc drive components are located, and a packing or sealing member 38 located between the carriage member 32 and the cover member 40 for preventing dust and foreign matter from reaching the closed space 36.

The carriage member 32 has a substantially rectangular top wall portion 33 and a peripheral flange portion 34 formed along the periphery of the top wall portion 33. Preferably, the peripheral flange portion 34 extends at a right angle with respect to the top wall portion 33. The peripheral flange portion 34 is circumferentially depressed inwardly to form, in the outer surface of the peripheral flange portion 34, a continuous groove 35 extending around the peripheral flange portion 34 for engagement with the sealing member 38. The cover member 40 has a top wall portion 41 and a sidewall portion 42. Preferably, the sidewall portion 42 extends at a right angle with respect to the top wall portion 41. The cover member 40 has a size somewhat greater than that of the carriage member 32 so that the carriage member 32 can fit loosely into the cover member 40, as best shown in FIG. 5. The inner surfaces of the sidewall portion 42 are depressed outwardly to form a continuous groove 43 for engagement with the sealing member 38.

The recording medium, in the form of a recording disc D, is secured on a turntable 51 driven by means of a spindle motor 52 secured on the top wall portion 33 of the carriage member 32. The transducer, in the form of a read/write head H supported by an arm 53, is positioned adjacent the disc D. The arm 53 is pivoted through a pivot shaft 54 on the top wall 33 of the carriage member 32. A head positioner, generally designated by the numeral 55, is provided for driving the arm 53. The head positioner 55 includes a voice coil 56 mounted on one end of the pivot shaft 54 and a magnetic circuit 57 including a stationary yoke, a permanent magnet, etc. In recording data or reproducing the recorded data, the head positioner 55 rotates the arm 53 to move the head H, across the surface of the disc D rotated by the spindle motor 10, from one track to another and centers the head over a selected track.

The sealing member 38 is an O-ring shaped resilient member made of rubber, plastic or the like. The sealing member 38 has one side held resiliently in the continuous groove 31 to loop around the peripheral flange portion 34 of the carriage member 32. It is, therefore, preferable that the continuous groove 31 has a cross-sectional area conforming generally to the one side of the sealing member 38. The carriage member 32 is combined with or secured to the cover member 40 when the carriage member 32 fits into the cover member 40 until the other side of the sealing member 38 is snap fittingly engaged within the continuous groove 43 formed in the inner surface of the sidewall portion 42. It is, therefore, preferable that the continuous groove 43 has a cross-sectional area conforming generally to the other side of the sealing member 38. In the combined position, the sealing member 38 provides resilient engagement with the outer surface of the peripheral flange portion 34 of the carriage member 32 and resilient engagement with the inner surface of the sidewall portion 42 of the cover member 40 and also sealingly closes the space 36 to keep the components free from dust. Preferably, the sealing member 38 has a circular cross-sectional area and the continuous grooves 35 and 43 have a semi-circular cross-sectional area, as best shown in FIG. 4. The numeral 60 designates tongues projecting from the end surfaces of the four sidewalls 42 for engagement with the carriage member 32 to hold the carriage member 32 in position within the cover member 36.

Figure 7:
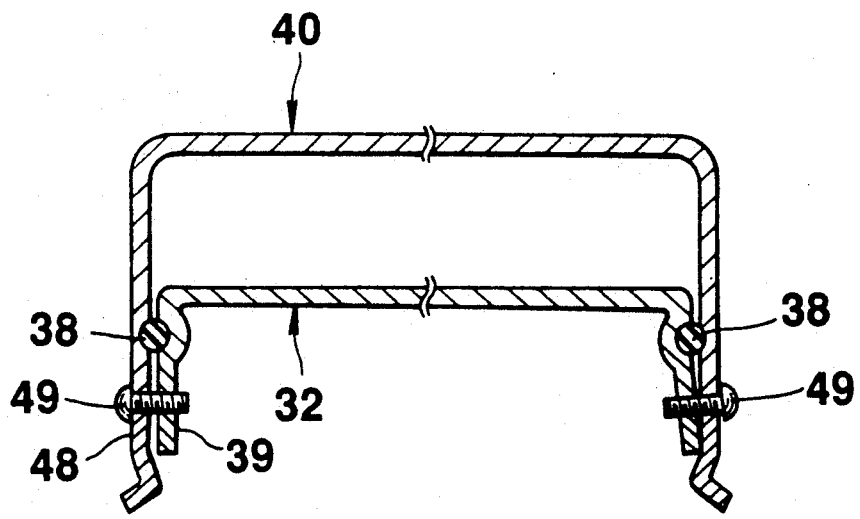
FIG. 7 is a sectional view of the disc drive unit of FIG. 6.
Figure 6:
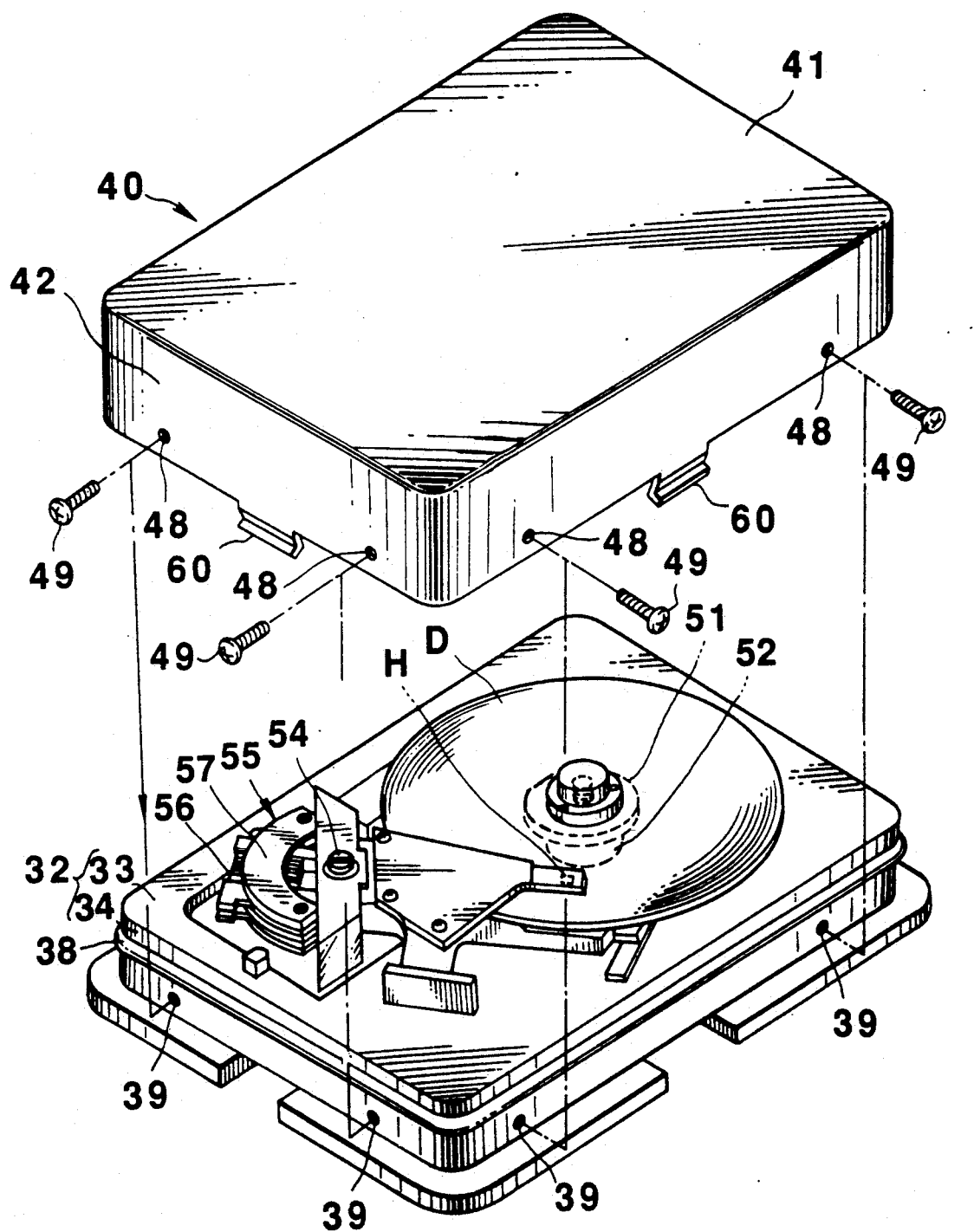
FIG. 6 is an exploded perspective view showing a modified form of the disc drive unit of the invention.

Referring to FIGS. 6 and 7, there is shown a modified form of the disc drive unit of the invention. In this modification, the strength of connection of the carriage and cover members 32 and 36 is reinforced by means of bolts 49 extending through respective holes 48 formed in the the sidewall portion 42 of the cover member 40 and threadedly through respective holes 39 formed in the flange portion 34 of the carriage member 32. Even when the bolts 49 are driven at different strengths, the top wall portion 33 of the carriage member 32 is not strained although the flange portion 34 of the carriage member 32 is strained. Consequently, no change occurs in the relative distance between the disc D and the head H.

According to the invention, the bending stresses caused by the resilient force of the sealing member 38 is applied to the peripheral sides of the carriage member 32. This is effective to minimize the bending moments acting on the carriage member 32 and, thus, minimize the tendency of the carriage member portion on which the disc drive components are mounted to be strained. In addition, the cover member 40 can be combined with the carriage member 32 merely by fitting the cover member 40 around the carriage member 32. Furthermore, the invention minimizes the number of parts necessary for the disc drive and increases the disc drive assembling efficiency.

What is claimed is:

1. A disc drive for a disc recording and reproducing apparatus having components including a transducer and a transducer positioner for moving the transducer with respect to a recording disc for recording data on the recording disc and reproducing recorded data from the recording disc, the disc drive comprising:

- a carriage member upon which the components are mounted, the carriage member having a top wall portion and a circumferential outer side surface forming a substantially right angle with respect to the top wall portion of the carriage member;
- a cover member for combination with the carriage member to define a closed space in which the components are located, the cover member having a top wall portion and an inner side surface extending therearound and forming a substantially right angle with respect to the top wall portion of the cover member; and
- a sealing member resiliently engaging the circumferential outer side surface of the carriage member and also resiliently engaging the inner side surface of the cover member, thereby sealing the closed space when the cover member is combined with the carriage member;
- wherein a first continuous groove is formed in at least one of the outer side surface of the carriage member and the inner side surface of the cover member for accommodating the sealing member.

2. A disc drive for a disc recording and reproducing apparatus having components including a transducer and a transducer positioner for moving the transducer with respect to a recording disc for recording data on the recording disc and reproducing recorded data from the recording disc, the disc drive comprising:

- a carriage member upon which the components are mounted, the carriage member having a top wall portion and an inner side surface extending therearound and forming a substantially right angle with respect to the top wall portion of the carriage member;
- a cover member for combination with the carriage member to define a closed space in which the components are located, the cover member having a top wall portion and a circumferential outer side surface forming a substantially right angle with respect to the top wall portion of the cover member; and
- a sealing member resiliently engaging the inner side surface of the carriage member and also resiliently engaging the outer side surface of the cover member, thereby sealing the closed space when the cover member is combined with the carriage member;
- wherein a first continuous groove is formed in at least one of the inner side surface of the carriage member and the outer side surface of the cover member for accommodating the sealing member.

3. A disc drive for a disc recording and reproducing apparatus having components including a transducer and a transducer positioner for moving the transducer with respect to a recording disc for recording data on the recording disc and reproducing recorded data from the recording disc, the disc drive comprising:

- a carriage member upon which the components are mounted, the carriage member having a top wall portion and peripheral side surfaces forming a substantially right angle with respect to the top wall portion of the carriage member;
- a cover member having a top wall portion with a periphery, and a sidewall portion depending from the periphery of the top wall portion and forming a substantially right angle with respect to the top wall portion of the cover member; and
- a sealing member disposed between the peripheral side surfaces of the carriage member and the sidewall portion of the cover member to provide resilient engagement with the peripheral side surfaces of the carriage member and also resilient engagement with the sidewall portion of the cover member, thereby sealing the cover member to the carriage member;
- wherein a first continuous groove is formed in at least one of the peripheral side surfaces of the carriage member and the sidewall portion of the cover member for accommodating the sealing member.

4. A disc drive for a disc recording and reproducing apparatus having components including a transducer and a transducer positioner for moving the transducer with respect to the recording disc for recording data on the recording disc and reproducing recorded data from the recording disc, the disc drive comprising:

- a carriage member having a top portion upon which the components are mounted, the top portion having a periphery, and a flange portion depending from the periphery of the top portion and forming a substantially right angle with respect to the top portion of the carriage member;
- a cover member having a top portion with a periphery, and a sidewall portion depending from the periphery of the top portion and forming a substantially right angle with respect to the top portion of the cover member; and
- a sealing member disposed between the flange portion of the carriage member and the sidewall portion of the cover member to provide resilient engagement with the flange portion of the carriage member and also resilient engagement with the sidewall portion of the cover member, thereby sealing the cover member to the carriage member;
- wherein a first continuous groove is formed in at least one of the flange portion of the carriage member and the sidewall portion of the cover member for accommodating the sealing member.

5. The disc drive as claimed in claim 4 wherein the first continuous groove is formed in the flange portion of the carriage member.

6. The disc drive as claimed in claim 5 wherein the sidewall portion of the cover member snaps over the sealing member.

7. The disc drive as claimed in claim 5 wherein a second continuous groove is formed in the sidewall portion of the cover member, and the sealing member held in the first continuous groove also fits into the second continuous groove of the cover member.

8. A disc drive for a disc recording and reproducing apparatus having components including a transducer and a transducer positioner for moving the transducer with respect to the recording disc for recording data on the recording disc and reproducing recorded data from the recording disc, the disc drive comprising:

- a carriage member upon which the components are mounted, the carriage member being formed with a top wall portion and a peripheral flange portion forming a substantially right angle with the top wall portion of the carriage member;
- a cover member for combination with the carriage member to define a closed spaced in which the components are located, the cover member having a top wall portion and a sidewall portion forming a substantially right angle with respect to the top wall portion of the cover member; and a resilient sealing member provided between the carriage member and the cover member to provide resilient engagement with the carriage member and resilient engagement with the cover member, thereby sealing the closed space when the cover member is combined with the carriage member;

wherein a first continuous groove is formed in at least one of the peripheral flange portion of the carriage member and the sidewall portion of the cover member for accommodating the sealing member.

9. The disc drive as claimed in claim 8 wherein the sealing member is secured in said first continuous groove.

* * * * *

UNITED STATES PATENT AND TRADEMARK OFFICE
CERTIFICATE OF CORRECTION

PATENT NO.   : 5,233,491
DATED        : August 3,1993
INVENTOR(S)  : Akira Kadonaga and Mamoru Osato Page 1 of 2

It is certified that error appears in the above-indentified patent and that said Letters Patent is hereby corrected as shown below:

In the Claims:

Col. 5, line 26, delete "for accommodating" and insert --with--
same line, after "member" insert --being located therein--
line 55, delete "for accommodating" and insert --with--
same line, after "member" insert --being located therein--

Col. 6, line 15, delete "for accommodating" and insert --with--
same line, after "member" insert --being located therein--
lines 42 & 43, delete "for accommodating and insert --with--
line 43, after "member" insert --being located therein--

UNITED STATES PATENT AND TRADEMARK OFFICE
CERTIFICATE OF CORRECTION

PATENT NO. : 5,233,491

DATED : August 3, 1993

INVENTOR(S) : Akira Kadonaga and Mamoru Osato

It is certified that error appears in the above-indentified patent and that said Letters Patent is hereby corrected as shown below:

Col. 8, line 6, delete "for accommodating" and insert --with--
same line, after "member" second occurrence insert --being located therein--

Signed and Sealed this

Sixth Day of June, 1995

Attest:

Attesting Officer

BRUCE LEHMAN

Commissioner of Patents and Trademarks